[19] United States Patent
Slack et al.

[11] Patent Number: 5,691,439
[45] Date of Patent: Nov. 25, 1997

[54] LOW SURFACE ENERGY POLYISOCYANATES AND THEIR USE IN ONE- OR TWO-COMPONENT COATING COMPOSITIONS

[75] Inventors: William E. Slack, Moundsville, W. Va.; Philip E. Yeske, Köln, Germany; Edward P. Squiller, Pittsburgh, Pa.

[73] Assignee: Bayer Corporation, Pittsburgh, Pa.

[21] Appl. No.: 767,056

[22] Filed: Dec. 16, 1996

[51] Int. Cl.$^6$ .................................................... C08G 18/61
[52] U.S. Cl. .............................. 528/49; 528/28; 528/69; 252/182.2
[58] Field of Search .................... 528/28, 49, 69; 252/182.2

[56] References Cited

U.S. PATENT DOCUMENTS 4,590,224  5/1986  Frisch, Jr. ............................ 521/155
5,574,122  11/1996  Yeske et al. ............................ 528/28

Primary Examiner—Rachel Gorr
Attorney, Agent, or Firm—Joseph C. Gil; Thomas W. Roy

[57] ABSTRACT

The present invention relates to polyisocyanate adducts containing allophanate groups, siloxane groups and optionally isocyanurate groups that are prepared by reacting compounds a) which i) are substantially free of hydroxyl groups and isocyanate groups,
ii) have an average of at least two urethane groups per molecule and
iii) contain 0 to 50% by weight of siloxane groups, based on the weight of the polyisocyanate adducts, with an excess quantity, based on the equivalents of urethane groups, of polyisocyanates b), which optionally contain siloxane groups, to form polyisocyanate adducts and optionally removing at least a portion of the unreacted excess polyisocyanates b), provided that compounds a) and polyisocyanates b) contain a total of at least 0.001% by weight, of siloxane groups, based on the weight of the polyisocyanate adducts. The present invention also relates to a process for preparing these polyisocyanates adducts, to blends of the polyisocyanates with other polyisocyanates that which do not contain siloxane groups and to the use of the polyisocyanate adducts or polyisocyanate blends, optionally in blocked form, in one- or two-component coating compositions.

18 Claims, No Drawings

LOW SURFACE ENERGY POLYISOCYANATES AND THEIR USE IN ONE- OR TWO-COMPONENT COATING COMPOSITIONS

BACKGROUND OF THE INVENTION

1. Field of the Invention

The present invention relates to low surface energy polyisocyanates which contain allophanate groups, siloxane groups and optionally isocyanurate groups, to a process for preparing these polyisocyanates, to blends of these polyisocyanates with other polyisocyanates that do not contain siloxane groups and to the use of these polyisocyanates or polyisocyanate blends in one- and two-component coating compositions.

2. Description of the Prior Art

Polyurethane coating compositions containing a polyisocyanate component, in either blocked or unblocked form and an isocyanate-reactive component, generally a high molecular weight polyol, are well known.

Although coatings prepared from these compositions possess many valuable properties, one property, in particular, which needs to be improved is the surface quality. It can be difficult to formulate coating compositions to obtain a coating having a smooth surface as opposed to one containing surface defects such as craters, etc.

It is believed that these difficulties are related to the high surface tension of the two-component coating compositions. Another problem caused by the high surface tension is the difficulty in cleaning the coatings. Regardless of their potential application area, there is a high likelihood that the coatings will be subjected to stains, graffiti, etc.

Accordingly, it is an object of the present invention to provide coating compositions which have reduced surface tension and, thus, are suitable for the production of coatings having lower surface energies and improved surfaces. It is an additional object of the present invention to provide coating compositions which have improved cleanability. It is a final object of the present invention to provide coating compositions which satisfy these requirements without substantially affecting the other valuable properties of the known polyurethane coatings.

Surprisingly, these objectives may be achieved by formulating coating compositions with the polyisocyanates according to the present invention containing allophanate groups, siloxane groups and optionally isocyanurate groups which are described hereinafter.

Polyisocyanates containing allophanate groups, siloxane groups and optionally isocyanurate groups are described in U.S. Pat. Nos. 5,574,122 and 5,646,227. The polyisocyanates disclosed in these copending applications are preferably prepared by reacting an excess of a diisocyanate starting material with a compound containing hydroxy groups and siloxane groups to initially form urethane groups, which are then converted to allophanate groups by reacting with the excess diisocyanate in the presence of an allophanatization and optionally a trimerization catalyst (if isocyanurate groups are desired).

One of the disadvantages of this preparation procedure is that it is difficult to avoid the presence of monoisocyanate-containing by-products in the resulting polyisocyanate. The amount of these by-products may be reduced according to the present invention by initially forming compounds containing urethane groups that are essentially free from isocyanate and isocyanate-reactive groups and subsequently reacting these compounds in the presence of excess polyisocyanate to convert the urethane groups to allophanate groups and optionally introduce isocyanurate groups.

U.S. Pat. No. 4,590,224 is directed to the production of fully reacted polymers, primarily in the form of molded articles or foams, which are prepared by reacting a polyisocyanate with a polysiloxane polyahl in the presence of a trimerization catalyst. In addition to the oligomerization of the polyisocyanate to form isocyanurate groups, a portion of the isocyanate groups will react with the polyahl to form urethane or urea groups depending upon the type of polyahl. This patent does not suggest the incorporation of allophanate groups into the polyisocyanate component and certainly does not recognize the importance of incorporating allophanate groups to maintain the clarity of polyurethane coatings. In addition, this patent does not suggest the two-step process for preparing the polyisocyanates according to the present invention.

SUMMARY OF THE INVENTION

The present invention relates to polyisocyanate adducts containing allophanate groups, siloxane groups and optionally isocyanurate groups that are prepared by reacting compounds a) which i) are substantially free of hydroxyl groups and isocyanate groups, ii) have an average of at least two urethane groups per molecule and iii) contain 0 to 50% by weight of siloxane groups (calculated as SiO, MW 44), based on the weight of the polyisocyanate adducts, with an excess quantity, based on the equivalents of urethane groups, of polyisocyanates b), which optionally contain siloxane groups, to form polyisocyanate adducts and optionally removing at least a portion of the unreacted excess polyisocyanates b), provided that compounds a) and polyisocyanates b) contain a total of at least 0.001% by weight, of siloxane groups, based on the weight of the polyisocyanate adducts.

The present invention also relates to a process for preparing these polyisocyanates adducts by reacting compounds which i) are substantially free of hydroxyl groups and isocyanate groups, ii) have an average of at least two urethane groups per molecule and iii) contain 0 to 50% by weight of siloxane groups, based on the weight of the polyisocyanate adducts, with an excess quantity, based on the urethane groups, of polyisocyanates, which optionally contain siloxane groups, to form the polyisocyanate adducts and optionally removing at least a portion of the unreacted excess polyisocyanates, provided that such compounds or such polyisocyanates contain at least 0.001% by weight of siloxane groups, based on the weight of the polyisocyanate adducts.

Finally, the present invention also relates to blends of these polyisocyanates with other polyisocyanates that do not contain siloxane groups and to the use of these polyisocyanates or polyisocyanate blends, optionally in blocked form, in one- or two-component coating compositions.

DETAILED DESCRIPTION OF THE INVENTION

Starting materials for the process according to the invention are compounds a) containing urethane groups and optionally siloxane groups and polyisocyanates b), preferably diisocyanates, which optionally contain siloxane groups, provided that at least one of these components contain siloxane groups. The two starting components are reacted together to form polyisocyanates containing allophanate groups, siloxane groups and optionally isocyanurate groups.

Compounds a) have an average of at least two urethane groups per molecule and a number average molecular weight, which may be calculated from the stoichiometry of the starting materials, of less than 10,000, preferably less than 5000 and more preferably less than 3000. The compounds are substantially free of isocyanate groups and hydroxyl groups, i.e., the NCO content of compounds a) is less than 2 wt. %, preferably less than 0.5 wt. % and more preferably less than 0.2 wt. % and the hydroxyl group content is less than 1 wt. %, preferably less than 0.3 wt. % and more preferably less than 0.1 wt. %. This objective may be achieved during the preparation of these compounds by reacting the starting components at an NCO/OH equivalent ratio of 1.2:1 to 1:1.2, preferably 1.1:1 to 1:1.1 and more preferably 1:1. The reaction to form urethane groups is generally carried out at a temperature of 20° to 130° C., preferably 50° to 90° C. The reaction is preferably carried out in the melt, although suitable organic solvents may be used.

Compounds a) may be prepared by reacting a polyol, preferably a diol, with a siloxane group-containing monoisocyanate optionally in admixture with other monoisocyanates; by reacting a siloxane group-containing polyol, preferably a diol, optionally in admixture with other polyols, with a monoisocyanate; by reacting a siloxane group-containing polyisocyanate, preferably a diisocyanate, optionally in admixture with other polyisocyanates, with a monohydroxy compound; or by reacting a polyisocyanate, preferably a diisocyanate, with a siloxane group-containing monohydroxy compound, optionally in admixture with other monohydroxy compounds.

In another embodiment of the present invention both of the compounds used to prepare compounds a) may contain siloxane groups. In addition, any of the preceding monofunctional compounds may be mixed with higher functional compounds, provided that the resulting urethane compounds are substantially free of isocyanate and hydroxy groups. The presence of these higher functional compounds results in chain extension, which introduces more urethane groups. If these urethane groups are subsequently converted to allophanate groups, the resulting products will have a higher isocyanate functionality.

Most preferably compounds a) are diurethanes prepared by reacting a diisocyanate with a siloxane group-containing monohydroxy compound.

The isocyanates used for the production of the compounds a) containing urethane groups are selected from linear or branched aromatic or (cyclo)aliphatic mono-, di- and/or polyisocyanates having a molecular weight of 99 to 1000, preferably 99 to 400 and more preferably 140 to 300, and an NCO content of 10 to 60 wt. %, preferably 18 to 60 wt. % and more preferably 30 to 50 wt. %. The average NCO functionality of these isocyanates is 1 to 4, preferably 1 to 2 and more preferably 2.

Examples of monoisocyanates, which may used alone or in admixture with di- or polyisocyanates to prepare the compounds containing urethane groups, include aromatic monoisocyanates such as phenyl isocyanate; (cyclo)aliphatic monoisocyanates having 4 to 18 carbon atoms such as n-butyl isocyanate, n-hexyl isocyanate, cyclohexyl isocyanate, n-stearylisocyanate; and siloxane groupcontaining aromatic or (cyclo)aliphatic monoisocyanates such as triethoxy-(3-isocyantopropyl)-silane.

Examples of suitable organic diisocyanates include 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanato-methyl-3,5,5-trimethylcyclohexane (isophorone diisocyanate or IPDI), 4,4'-and/or 2,4'-diisocyanato-dicyclohexylmethane, 1,3- and 1,4-bis(isocyanatomethyl)-cyclohexane, bis-(4-isocyanato-3-methyl-cyclohexyl)-methane, xylylene diisocyanate, α,α, α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 2,4- and/ or 2,6-toluene diisocyanate, 2,4- and/or 4,4'-diphenyl methane diisocyanate, 1,5-diisocyanato naphthalene and mixtures thereof.

Polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used. Also suitable are polyisocyanates containing siloxane groups. For example, those disclosed in U.S. Pat. No. 4,942,164, herein incorporated by reference.

Derivatives of the preceding isocyanates containing biuret groups, uretdione groups, isocyanurate groups, carbodiimide and especially urethane groups are also suitable for preparing the compounds a), but are less preferred.

Suitable alcohols for preparing the compounds containing urethane groups are selected from monohydric to hexahydric alcohols having a molecular weight 32 to 900, preferably 74 to 300, and mixtures of these alcohols. Examples of suitable monohydric alcohols include saturated monohydric alcohols such as methanol, ethanol, n-propanol, isopropanol, methoxypropanol and the isomeric butanols, pentanols, hexanols, octanols, decanols, dodecanols and octadecanols.

Examples of polyhydric alcohols include ethylene glycol, propylene glycol, butanediol-1,4, hexanediol-1,6, neopentyl glycol, 2-methylpropanediol-1,3, 2,2,4-trimethylpentanediol-1,3, dimeric fatty alcohols, trimeric fatty alcohols, glycerol, trimethylolpropane, trimethylolethane, the isomeric hexanetriols, pentaerythritol and sorbitol. Also suitable are unsaturated alcohols such as allyl alcohol, trimethylolpropane diallyl ether, butenediol and monofunctional alcohols that are derived from corresponding acids or acidic mixtures of unsaturated synthetic and naturally-occurring fatty acids.

Also suitable for preparing compounds a) are alkoxylation products containing ether groups of the monohydric and polyhydric alcohols previously set forth and/or transesterification products containing hydroxyl groups of fats or oils with polyhydric alcohols, in particular glycerol, trimethylolpropane or pentaerythritol.

Suitable compounds containing isocyanate-reactive groups and siloxane groups, which are suitable for preparing compounds a), are those containing one or more (preferably one or two and more preferably one) isocyanate-reactive groups (preferably hydroxyl groups) directly attached to carbon atoms, and one or more siloxane groups, preferably in the form of dimethyl siloxane groups, $-Si(CH_3)_2O-$.

Examples of these compounds are those corresponding to the formula $$Y-R^1-X-[Si(R^2)_2O-]_n-[Si(R^2)_2-X]_m-R^1-Y$$

wherein $R^1$ represents an optionally inertly substituted, divalent hydrocarbon radical, preferably an alkylene radical (such as methylene, ethylene, propylene or butylene) or a polyoxyalkylene group (such as a polyoxyethylene or polyoxypropylene group), $R^2$ represents hydrogen or an optionally inertly substituted lower alkyl, phenyl or benzyl group, preferably ethyl or methyl, more preferably methyl, X represents a linkage between an $R^1$ group and a Si atom, e.g., a covalent bond, —O— or —COO—, Y represents hydrogen or an isocyanate-reactive group, preferably hydrogen, a hydroxyl group or a primary or secondary amino group, more preferably a hydrogen or a hydroxyl group, m is 0 or 1 and n is an integer from 1 to 1,000, preferably 2 to 100 and more preferably 4 to 15.

Inert substituents are those that do not interfere with the reaction of the siloxane compound with the polyisocyanate or the allophanate and/or trimerization reaction of the isocyanate groups. Examples include halogen atoms such as fluorine.

Examples of compounds containing one isocyanate-reactive group in which $R^1$ represents an oxyalkylene group are compounds corresponding to the formula $$Y-(CHR^3-CH_2O-)_o-(R^4)_m-[Si(R^2)_2O-]_n-[Si(R^2)_2-X^1]_m-R^4-H$$

and examples of compounds containing more than one isocyanate-reactive group in which $R^1$ represents an oxyalkylene group are compounds corresponding to the formula $$Y-(CHR^3-CH_2O-)_o-(R^4)_m-[Si(R^2)_2O-]_n-(CH_2-CHR^3-O-)_p-CH_2-CHR^3-Y$$

wherein $R^2$, Y, m and n are as defined above, $R^3$ is hydrogen or an alkyl group having 1 to 12 carbon atoms, preferably hydrogen or methyl, $R^4$ represents an optionally inertly substituted, divalent hydrocarbon radical, preferably an alkylene radical (such as methylene, ethylene, propylene or butylene), $X^1$ represents a linkage between an $R^4$ group and a Si atom, e.g., a covalent bond, —O— or —COO—, o is an integer from 1 to 200, preferably 2 to 50 and more preferably 4 to 25 and p is an integer from 0 to 200, preferably 2 to 50 and more preferably 4 to 25.

These siloxane compounds are prepared by reacting the appropriate siloxane with an amount of an alkylene oxide (preferably ethylene or propylene oxide) sufficient to prepare a compound having the desired siloxane content. Amino or alkylene amino groups are introduced by aminating the resulting hydroxyl-terminated compound in known manner.

Other suitable siloxane-containing compounds may be linear, branched or cyclic and have a molecular weight (number average molecular weight as determined by gel permeation chromatography using polystyrene as standard) of up to 50,000, preferably up to 10,000, more preferably up to 6000 and most preferably up to 2000. These compounds generally have OH numbers of greater than 5, preferably greater than 25 and more preferably greater than 35. Compounds of this type are disclosed in "Silicon Compounds", 5th Edition, which is available from Hüls America, Inc.

Most preferably, compounds a) are prepared from monomeric diisocyanates and siloxane group-containing monohydroxy compounds.

The molecular weight of compound a) containing urethane groups is adjusted by suitable selection of the isocyanate and alcohol components and, in particular, by their average functionality. At least 20 mole % of either the isocyanate or alcohol component is made up of monofunctional components to bring about chain termination during the reaction to form urethane groups. This means that the average functionality of the isocyanate and alcohol components is preferably less than 2.

It is also possible in accordance with the present invention to use urethane group-containing compounds prepared by other methods such as the known "phosgene-free urethane synthesis" described, for example, in EP-A-0,027,940, EP-A-0,027,952, EP-A-0,027,953, EP-A-0,323,514 and EP-A-0,355,443.

After preparation of the compounds containing urethane groups, they are reacted with polyisocyanate component b), which is selected from the organic polyisocyanates previously set forth for use in preparing compound a), with the exception of monoisocyanates. Preferably, the organic polyisocyanates are those that can be removed by distillation following the formation of the allophanate groups. Monoisocyanates should be used, if at all, in only minor quantities because when they react with urethane groups, they result in non-functional allophanate groups, i.e., groups that do not contain isocyanate groups. The average functionality of component b) is 2 to 4, preferably 2.

The reaction of the urethane group-containing compound a) with polyisocyanate component b) is carried out at an NCO/urethane equivalent ratio of 3:1 to 100:1, preferably 6:1 to 60:1 and more preferably 8:1 to 30:1, and at a temperature of 50° C. to 250° C., preferably 60° C. to 150° C. and more preferably 70° C. to 120° C. Suitable methods for preparing allophanate group containing polyisocyanates are known and described in U.S. Pat. Nos. 3,769,318, 4,160,080 and 4,177,342 and 4,738,991, the disclosures of which are herein incorporated by reference.

The allophanatization of compounds a) in the presence of polyisocyanates b) may be carried out in the absence or in the presence of solvents which are inert to isocyanate groups. Depending on the area of application of the products according to the invention, low to medium-boiling solvents or high-boiling solvents can be used. Suitable solvents include esters such as ethyl acetate or butyl acetate; ketones such as acetone or butanone; aromatic compounds such as toluene or xylene; halogenated hydrocarbons such as methylene chloride and trichloroethylene; ethers such as diisopropylether; and alkanes such as cyclohexane, petroleum ether or ligroin.

Instead of using catalysts that promote the formation of allophanate groups, it is also possible in accordance with the present invention to use catalysts that promote the formation of allophanate groups and isocyanurate groups. Suitable methods and catalysts for the preparation of polyisocyanates containing isocyanurate groups and allophanate groups are known and described in U.S. Pat. Nos. 5,124,427, 5,208,334, 5,235,018, 5,290,902 and 5,444,146, the disclosures of which are herein incorporated by reference. The trimerization of the starting diisocyanate mixture may be carried out in the absence or in the presence of solvents which are inert to isocyanate groups, such as those previously described.

Examples of suitable catalysts include tetraalkylammonium hydroxides or arylalkylammonium hydroxides; metal salts such as iron(III) chloride or potassium octoate; zinc compounds such as zinc stearate, zinc octoate, zinc naphthenate or zinc acetylacetonate; tin compounds such as tin(II) octoate, tin(II) 2-ethyl-hexanoate, tin(II) laurate, dibutyltin oxide, dibutyltin dichloride, dibutyltin diacetate, dibutyltin dilaurate, dibutyltin maleate or dioctyltin diacetate; aluminum tri(ethyl acetoacetate); and compounds of manganese, cobalt or nickel and mineral acids such as trifluoroacetic acid, sulphuric acid, hydrogen chloride, hydrogen bromide, phosphoric acid or perchloric acid.

The catalysts are preferably added prior to the allophanatization reaction. While they may be added prior to the urethane formation, this is less preferred because of the possibility of forming allophanate groups, which would affect the stoichiometry of the urethane formation reaction. The catalysts are used in concentrations of 0.001 to 5 wt. %, preferably 0.005 to 1 wt. %.

At a temperature of about 50° C. and in the presence of the required catalyst or catalyst solution the allophanatization reaction begins and is indicated by an exothermic reaction. When catalysts for the formation of allophanate groups and isocyanurate groups are present, it is possible to control the rate of formation of the these two groups. As the reaction temperature increases the conversion rate of urethane groups to allophanate groups increases faster than the formation of isocyanurate groups. Accordingly, by varying the reaction temperature, it is possible to obtain different ratios of allophanate groups to isocyanurate groups.

The progress of the reaction is followed by determining the NCO content by a suitable method such as titration, refractive index or IR analysis. The reaction may be allowed to proceed to completion or it may be terminated at the desired degree of allophanatization. The allophanatization reaction is terminated after 50 to 100%, preferably 80 to 100% by weight, more preferably 90 to 100% by weight and most preferably 95 to 100% by weight of the urethane groups have been converted to allophanate groups. The polyisocyanate adducts should contain sufficient allophanate groups to ensure that the adducts remain stable and homogeneous in storage for 3 months at 25° C. If the polyisocyanate adducts contain an insufficient number of allophanate groups, the product may be cloudy and a gradual settling of insoluble constituents may take place during storage.

The termination of the allophanatization and optionally trimerization reactions can take place, for example, by the addition of a catalyst poison, such as those disclosed in the previously discussed literature references. For example, when using basic catalysts the reaction is terminated by the addition of a quantity, which is at least equivalent to the catalyst quantity, of an acid chloride such as benzoyl chloride. When using heat-labile catalysts, for example, certain quaternary ammonium hydroxides, poisoning of the catalyst by the addition of a catalyst-poison may be dispensed with, since these catalysts decompose in the course of the reaction. The use of suspended catalysts is also possible. These catalysts are removed after achieving the desired degree of trimerization by filtering the reaction mixture.

The working-up of the reaction mixture, optionally after previous separation of insoluble catalyst constituents, may take place in various ways depending upon how the reaction was conducted and the area of application for the isocyanates. Any solvent used during the reaction and any unreacted monomer present in the polyisocyanate product may optionally be removed, e.g., by distillation, in known manner. The product obtained after distillation generally contains a total of less than 2% by weight, preferably less than 1% by weight, more preferably less than 0.5% by weight and most preferably less than 0.2% by weight, based on the solids content of the polyisocyanate adduct, of free (unreacted) polyisocyanate component b).

The products according to the invention are polyisocyanate adducts containing allophanate groups, siloxane groups and optionally isocyanurate groups, which have an NCO content from 2 to 30 wt. %, preferably 5 to 28 wt. %; an average functionality of 2 to 4, preferably 2 to, 3 and more preferably 2 to 2.5; and a minimum siloxane group content (calculated as SiO, MW 44) of 0.001% by weight, preferably 0.01% by weight and more preferably 0.1% by weight, based on solids, and a maximum siloxane group content of 50% by weight, preferably 10% by weight, more preferably 7% and most preferably 3% by weight, based on solids.

The products according to the invention range from low viscosity liquids having a viscosity of 200 mPa.s to high viscosity liquids to solids. The low viscosity products are generally obtained from aliphatic diisocyanate starting materials, such as 1,6-hexamethylene diisocyanate, and have a viscosity of less than 5000, preferably less than 2000 and more preferably less than 1300 mPa.s. High viscosity products may also be obtained from these diisocyanates if the oligomerization reaction is terminated at a significantly lower NCO content. The high viscosity products have a minimum viscosity of 5000, preferably 12,000 and more preferably 15,000 to 70,000 mPa.s and a maximum viscosity of 100,000, preferably 90,000 and more preferably 70,000 mPa.s. The viscosities are determined at 25° C. from products, which do not contain solvent (100% solids) and are substantially free from excess, unreacted monomer. Extremely highly viscous to solid products are generally obtained from cyclic diisocyanates such as isophorone diisocyanate, bis-(4-isocyanatocyclohexyl)-methane or the previously described aromatic diisocyanates.

The polyisocyanate adducts have an allophanate group content (calculated as $N_2,C_2,H,O_3$, MW 101) of at least 5%, preferably at least 10% by weight. The upper limit for the allophanate group content is 35%, preferably 30% by weight. The polyisocyanate adducts have an isocyanurate group content (calculated as $N_3,C_3,O_3$, MW 126) of up to 25% by weight, preferably up to 20% by weight. When using allophanatization/trimerization catalysts, the polyisocyanate adducts will generally have an isocyanurate group content of at least 5%, preferably at least 10% by weight. Even when using highly selective allophanatization catalysts, minor quantities of isocyanurate groups are formed.

Depending on the viscosity of the products according to the invention, it may be useful to dilute them with inert solvents. Suitable solvents include those previously set forth for the production of the compounds containing allophanate and optionally isocyanurate groups.

The products according to the invention are valuable starting materials for the production of polyisocyanate polyaddition products by reaction with compounds containing at least two isocyanate reactive groups. The products according to the invention may also be moisture-cured to form coatings. However, they are preferably used in combination with an isocyanate-reactive component in one- or two-component coating compositions, more preferably polyurethane coating compositions. When the polyisocyanate adducts are unblocked, two-component compositions are obtained. To the contrary when the polyisocyanate adducts are blocked, one-component compositions are obtained.

Prior to their use in coating compositions, the polyisocyanate adducts according to the invention may be blended with other known polyisocyanates, e.g. , polyisocyanate adducts containing biuret, isocyanurate, allophanate, urethane, urea, carbodiimide, and/or uretdione groups. The amount of the polyisocyanates adducts according to the invention that must be blended with these other polyisocyanates is dependent upon the siloxane group content of the polyisocyanates according to the invention, the intended application of the resulting coating compositions and the amount of low surface energy properties which are desired for this application.

To obtain low surface energy properties the resulting polyisocyanate blends should contain a minimum of 0.001% by weight, preferably 0.01% by weight and more preferably 0.1% by weight, of siloxane groups (MW 44), based on solids, and a maximum of 10% by weight, preferably 7% by weight and more preferably 3% by weight of siloxane groups (MW 44), based on solids. By knowing the siloxane content of the polyisocyanate mixtures according to the invention and the desired siloxane content of the resulting polyisocyanate blends, the relative amounts of the polyisocyanate adducts according to the invention and the other polyisocyanates may be readily determined. The blends preferably have an isocyanate content of 10 to 35%, more preferably 12 to 25% by weight, based on solids.

Any of the polyisocyanate adducts according to the invention can be blended with other polyisocyanates. However, the polyisocyanate adducts to be blended preferably have a minimum siloxane content of 5% by weight, more preferably 10% by weight and most preferably 20% by weight, and preferably have a maximum siloxane content of 50% by weight, more preferably 45% by weight. These so-called "concentrates" may then be blended with other polyisocyanates to form polyisocyanate blends that may be used to prepare coatings having low surface energy characteristics. The concentrates preferably have an isocyanate content of 2 to 15%, preferably 2 to 10% by weight, based on solids.

Preferred reaction partners for the products according to the invention are the polyhydroxy polyesters, polyhydroxy polyethers, polyhydroxy polyacrylates, polyhydroxy polylactones, polyhydroxy polyurethanes, polyhydroxy polyepoxides and optionally low molecular weight, polyhydric alcohols known from polyurethane coatings technology. Polyamines, particularly in blocked form, for example as polyketimines, oxazolidines or polyaldimines are also suitable reaction partners for the products according to the invention. Also suitable are polyaspartic acid derivatives (succinates) containing secondary amino groups, which also function as reactive diluents.

To prepare the coating compositions the amount of the polyisocyanate component and the isocyanate reactive component are selected to provide equivalent ratios of isocyanate groups (whether present in blocked or unblocked form) to isocyanate-reactive groups of about 0.8 to 3, preferably about 0.9 to 1.5.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methyl-piperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The products according to the invention are also valuable starting materials for one-component coating compositions, preferably polyurethane coating compositions, in which the isocyanate groups are used in a form blocked by known blocking agents. The blocking reaction is carried out in known manner by reacting the isocyanate groups with suitable blocking agents, preferably at an elevated temperature (e.g. about 40° to 160° C.), and optionally in the presence of a suitable catalyst, for example, the previously described tertiary amines or metal salts.

Suitable blocking agents include monophenols such as phenol, the cresols, the trimethylphenols and the tert. butyl phenols; tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidine, N-phenyl toluidine and N-phenyl xylidine; imides such as succinimide; lactams such as ε-caprolactam and δ-valerolactam; pyrazoles such as 3,5-dimethyl pyrazole; oximes such as butanone oxime, methyl amyl ketoxime and cyclohexanone oxime; mercaptans such as methyl mercaptan, ethyl mercaptan, butyl mercaptan, 2-mercaptobenzthiazole, α-naphthyl mercaptan and dodecyl mercaptan; and triazoles such as 1H-1,2,4-triazole.

The polyisocyanate adducts according to the invention may also be used as the polyisocyanate component in two-component water borne coating compositions. To be useful for in these compositions the polyisocyanate adducts must be rendered hydrophilic either by blending with external emulsifiers or by a reaction with compounds containing cationic, anionic or non-ionic groups. Methods for rendering the polyisocyanates hydrophilic are disclosed in copending application, U.S. Pat. Nos. 5,194,487 and 5,200,489, the disclosures of which are herein incorporated by reference. The reduced surface tension of the modified polyisocyanate mixtures enhance pigment dispersion and substrate wetting.

The coating compositions may also contain other additives such as wetting agents, flow-control agents, levelling agents, skin inhibitors, anti-foaming agents, fillers (such as silica, aluminum silicate and high boiling waxes), substances for controlling the viscosity, pigments, dyes, UV absorbers and thermal and oxidative stabilizers. The coating compositions may be applied to the substrate to be coated in solution or from the melt by conventional methods such as painting, rolling, pouring, spraying, dipping or flow coating. Suitable substrates include wood, plastics, leather, paper, textiles, glass, ceramics, plaster, masonry, metals and concrete.

The coating compositions containing the polyisocyanate adducts according to the invention provide coatings which have good dry times, adhere well to a metallic base, and are particularly light-fast, color-stable in the presence of heat and very resistant to abrasion. Furthermore, they are characterized by high hardness, elasticity, very good resistance to chemicals, high gloss, good weather resistance, good environmental etch resistance and good pigmenting qualities. Above all, the coating compositions have an excellent surface appearance and excellent cleanability.

The invention is further illustrated, but is not intended to be limited by the following examples in which all parts and percentages are by weight unless otherwise specified. The siloxane group contents are based on SiO, MW 44.

EXAMPLES

Polyisocyanate 1 - Comparison

A biuret group-containing polyisocyanate prepared from 1,6-hexamethylene diisocyanate and having an isocyanate content of about 23%, a content of monomeric diisocyanate of <0.7% and a viscosity at 25° C. of 1300–2200 mPa.s (available from Bayer Corp. as Desmodur N 3200).

Polyisocyanates 2 and 3 - According to the invention

HDI and a butyl initiated, carbinol-terminated, polydimethylsiloxane alcohol (available from Chisso Corp. as Silaplane FM-0411, MW 1000) at an NCO/OH equivalent ratio of 1:1 were added to a 3-neck flask equipped with a gas bubbler, mechanical stirrer, thermometer and condenser. Dry nitrogen was bubbled through the stirred reaction mixture while it was heated to 90° C. After 4 hours at 90° C., no free NCO groups remained as measured by IR. 10 equivalents, based on the equivalents of urethane groups present in the diurethane, of either HDI or IPDI were added to the diurethane, the resulting mixture was heated to 120° C. and stannous octoate was added dropwise as catalyst. When the NCO content reached the desired value, the reaction was stopped by adding 1.0 equivalent (based on the catalyst) of di(2-ethylhexyl) phosphate. Excess diisocyanate monomer was removed from the resulting crude reaction mixture by thin film evaporation to provide the final product. The diisocyanate reacted with the diurethane, catalyst amount, NCO content at termination, and properties of the final product are set forth in Table 1. The final products had solid contents of 100%.

TABLE 1

| Polyisocyanate | 2 | 3 | 1 (Comp) |
|---|---|---|---|
| Diisocyanate | HDI | IPDI | — |
| Catalyst level (ppm) | 250 | 1250 | — |
| Crude % NCO | 27.4 | 23.9 | — |
| Stripped % NCO | 9.1 | 4.8 | — |
| Stripped Visc. mPa · s @ 25° C. | 448 | 1411 | — |
| Stripped % Yield | 61.2 | 43.9 | — |
| Stripped % SiO (Theoretical) | 39.8 | 38.1 | 0 |
| Liquid Surface Tension (Dynes/cm) | 24.7 | 24.8 | 48.6 |

Polyisocyanate 4 - According to the invention 2.47 parts of triethoxy (3-isocyanatopropyl) silane and 0.96 parts of tripropylene glycol were added to a reactor equipped with a gas bubbler, stirrer and thermometer. The reaction mixture was heated to 70° C. and held until the NCO peak in the IR scan disappeared. 100 parts of HDI were added to the diurethane and the resulting mixture was heated to 90° C. 0.83 parts of a 0.5% solution of trimethylbenzyl ammonium hydroxide catalyst in ethyl acetate was then added to this mixture with stirring. The catalyst solution was added at a rate such that the reaction mixture was maintained at about 90° C. After the catalyst addition was complete, the reaction mixture was maintained at 90° C. for an additional 15 minutes, after which 0.01 parts of di(2-ethylhexyl) phosphate were added. The resulting reaction mixture had an NCO content of 39.4%. Excess HDI monomer was removed from the reaction mixture by wiped, thin film evaporation and the resulting product was filtered (1 micron). A liquid diallophanate-modified polyisocyanate was obtained which had a viscosity at 25° C. of 6615 mPa.s, an NCO content of 19.4%, an HDI monomer content of 3.7%, a siloxane group content of 0.90% and a liquid surface tension of 34.3 dynes/cm.

Polyisocyanate 5 - According to the invention 0.35 parts of HDI and 5.65 parts of a butyl initiated, carbinol-terminated, polydimethylsiloxane alcohol (available from Chisso Corp. as Silaplane FM-0411, MW 1000) were added to a reactor equipped with a gas bubbler, stirrer and thermometer. The reaction mixture was heated to 80° C. and held until the NCO peak in the IR scan disappeared. 300 parts of HDI were added to the diurethane and the resulting mixture was heated to 90° C. 2.5 parts of a 0.5% solution of trimethylbenzyl ammonium hydroxide catalyst in ethyl acetate was then added to this mixture with stirring. The catalyst solution was added at a rate such that the reaction mixture was maintained at about 90° C. After the catalyst addition was complete, the reaction mixture was maintained at 90° C. for an additional 15 minutes, after which 0.01 parts of di(2-ethylhexyl) phosphate were added. A hazy solution was obtained having an NCO content of 42.3%. Excess HDI monomer was removed from the reaction mixture by wiped, thin film evaporation and the resulting product was filtered (1 micron). A liquid diallophanate-modified polyisocyanate was obtained which had a viscosity at 25° C. of 920 mPa.s, an NCO content of 20.8%, an HDI monomer content of 2.0% and a siloxane group content of 0.13%.

Preparation of Component I

Ingredients 1–7 were mixed at a low speed using the amounts set forth in Table 2. The speed was then increased and the grind continued until a Hegmann Grind >7 was achieved. This system was then blended with the amounts of ingredients 8–11 set forth in Table 2. After mixing the composition was filtered through cheesecloth and stored in a closed container.

TABLE 2

| | Ingredients |
|---|---|
| 1. 24.7 parts | of a polyester polyol (available as Desmophen 631A-75 from Bayer Corporation) |
| 2. 39.1 parts | of titanium dioxide (available as Ti-Pure R-960 from Dupont) |
| 3. 0.3 parts | of a grinding aid (available as Anti-Terra U from Byk Chemie) |
| 4. 3.1 parts | of a celluose acetate butyrate (available as CAB 551-0.01 from Eastman) |
| 5. 1.0 part | of an anti-settling agent (availabie as MPA-2000X from Rheox) |
| 6. 0.4 parts | of a 0.4% solution of dibutyltin dilaurate (available as Metacure T-12 from Air Products and Chemicals) |
| 7. 8.4 parts | of a polyester polyol (available as Desmophen 670A-80 from Bayer Corporation |
| 8. 0.2 parts | of a tertiary amine catalyst (available as Desmorapid PP from Bayer AG) |
| 9. 1.4 parts | of 2,4-pentanedione |
| 10. 18.8 parts | of methyl n-amyl ketone |
| 11. 2.6 parts | of diisobutyl ketone |

Film Preparation

Component I was blended with the amounts of the components set forth in Table 3 (NCO/OH equivalent ratio 1.24:1; siloxane group content 0.06%, based on the weight of the dried film). After mixing the composition was sprayed out to a 3 mil wet film thickness. The films were allowed to cure for two weeks at a constant temperature and humidity of 70° C. and 55%. The surface energies of the resulting films are set forth in Table 3.

TABLE 3

| Example | 1 | 2 | 3 (Comp) |
|---|---|---|---|
| Component 1 | 73.5 | 73.5 | 73.5 |
| Polyisocyanate 1 | 18 | 18 | 18.1 |
| Methyl ethyl ketone | 7.1 | 7.1 | 7.1 |
| Methyl amyl ketone | 1.3 | 1.3 | 1.3 |
| Polyisocyanate 2 | 0.1 | — | 0 |
| Polyisocyanate 3 | — | 0.1 | 0 |
| Film Surface Energy (Dynes/cm) | 22.6 | 21.7 | 31.5 |

Surface Energy Measurements

All reported liquid (resin) surface energies (in dynes/cm) were obtained using the ring or Du Nouy method. In this static method, the force applied on a thin platinum ring was measured using a tensiometer.

All reported solid (coating) surface energies (in dynes/cm) were obtained by the Owens-Wendt procedure. The contact angle of two solvents (water and methylene iodide) were measured with a goniometer. Several readings were taken and averaged. The averages were then used to calculate the solid surface energy of the coating, taking into account the contributions of polar and dispersive forces.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate adduct containing allophanate groups, siloxane groups and optionally isocyanurate groups that is prepared by reacting a compound a) which
   i) is substantially free of hydroxyl groups and isocyanate groups,
   ii) has an average of at least two urethane groups per molecule and
   iii) contains 0 to 50% by weight of siloxane groups (calculated as SiO, MW 44), based on the weight of the polyisocyanate adduct, with an excess quantity, based on the equivalents of urethane groups, of a polyisocyanate b), which optionally contains siloxane groups, to form a polyisocyanate adduct and optionally removing at least a portion of the unreacted excess polyisocyanate b), provided that compound a) and polyisocyanate b) contain a total of at least 0.001% by weight, of siloxane groups, based on the weight of the polyisocyanate adduct.

2. The polyisocyanate adduct of claim 1 wherein compound a) contains 0.01 to 50% by weight of siloxane groups.

3. The polyisocyanate adduct of claim 2 wherein compound a) is prepared by reacting an aliphatic diisocyanate with a siloxane group-containing compound containing one hydroxy group.

4. The polyisocyanate adduct of claim 2 wherein compound a) is prepared by reacting a monoisocyanate with a compound containing two hydroxy groups.

5. The polyisocyanate adduct of claim 3 wherein said aliphatic diisocyanate comprises 1,6-hexamethylene diisocyanate.

6. The polyisocyanate adduct of claim 1 wherein compound a) contains 20 to 50% by weight of siloxane groups, based on the weight of the polyisocyanate adduct.

7. The polyisocyanate adduct of claim 2 wherein compound a) contains 20 to 50% by weight of siloxane groups, based on the weight of the polyisocyanate adduct.

8. The polyisocyanate adduct of claim 3 wherein compound a) contains 20 to 50% by weight of siloxane groups, based on the weight of the polyisocyanate adduct.

9. The polyisocyanate adduct of claim 4 wherein compound a) contains 20 to 50% by weight of siloxane groups, based on the weight of the polyisocyanate adduct.

10. The polyisocyanate adduct of claim 5 wherein compound a) contains 20 to 50% by weight of siloxane groups, based on the weight of the polyisocyanate adduct.

11. A polyisocyanate composition comprising
    A) a polyisocyanate adduct containing allophanate groups, siloxane groups and optionally isocyanurate groups that is prepared by reacting a compound a) which
       i) is substantially free of hydroxyl groups and isocyanate groups,
       ii) has an average of at least two urethane groups per molecule and
       iii) contains 20 to 50% by weight of siloxane groups, based on the weight of the polyisocyanate adduct,
       with an excess quantity, based on the equivalents of urethane groups, of a polyisocyanate b) to form a polyisocyanate adduct and optionally removing at least a portion of the unreacted excess polyisocyanate b), and
    B) a polyisocyanate adduct containing biuret, isocyanurate, allophanate, urethane, urea, carbodiimide and/or uretdione groups, wherein component A) and B) are present in amounts such that said polyisocyanate composition has a siloxane group content, based on solids, of 0.001 to 10% by weight.

12. The polyisocyanate composition of claim 11 wherein compound a) contains 0.01 to 50% by weight of siloxane groups.

13. The polyisocyanate composition of claim 12 wherein compound a) is prepared by reacting an aliphatic diisocyanate with a siloxane group-containing compound containing one hydroxy group.

14. The polyisocyanate composition of claim 12 wherein compound a) is prepared by reacting a monoisocyanate with a compound containing two hydroxy groups.

15. The polyisocyanate composition of claim 13 wherein said aliphatic diisocyanate comprises 1,6-hexamethylene diisocyanate.

16. A process for the preparation of a polyisocyanate adduct containing allophanate groups, siloxane groups and optionally isocyanurate groups which comprises reacting a compound a) which
    i) is substantially free of hydroxyl groups and isocyanate groups,
    ii) has an average of at least two urethane groups per molecule and
    iii) contains 0 to 50% by weight of siloxane groups, based on the weight of the polyisocyanate adduct,
    with an excess quantity, based on the equivalents of urethane groups, of a polyisocyanate b), which optionally contains siloxane groups, to form a polyisocyanate adduct and optionally removing at least a portion of the unreacted excess polyisocyanate b), provided that compound a) and polyisocyanate b) contain a total of at least 0.001% by weight, of siloxane groups, based on the weight of the polyisocyanate adduct.

17. A two-component coating composition containing the polyisocyanate adduct of claim 1 and a compound containing at least two isocyanate-reactive groups.

18. A one-component coating composition containing the polyisocyanate adduct of claim 1, in which the isocyanate groups are blocked, and a compound containing at least two isocyanate-reactive groups.

* * * * *